US012168555B2

(12) United States Patent
Wynn

(10) Patent No.: US 12,168,555 B2
(45) Date of Patent: Dec. 17, 2024

(54) MULTI-PURPOSE DECORATIVE RECEPTACLES AND KITS

(71) Applicant: Tamara Wynn, Sherman Oaks, CA (US)

(72) Inventor: Tamara Wynn, Sherman Oaks, CA (US)

(73) Assignee: Tamara Wynn, Sherman Oaks, CA (US)

( * ) Notice: Subject to any disclaimer, the term of this patent is extended or adjusted under 35 U.S.C. 154(b) by 0 days.

(21) Appl. No.: 18/056,738

(22) PCT Filed: Jun. 6, 2022

(86) PCT No.: PCT/US2022/032352
§ 371 (c)(1),
(2) Date: Nov. 18, 2022

(87) PCT Pub. No.: WO2022/265876
PCT Pub. Date: Dec. 22, 2022

(65) Prior Publication Data

US 2023/0391514 A1 Dec. 7, 2023

Related U.S. Application Data

(60) Provisional application No. 63/211,487, filed on Jun. 16, 2021.

(51) Int. Cl.
*B65D 51/24* (2006.01)
*B65F 1/16* (2006.01)

(52) U.S. Cl.
CPC ................ *B65D 51/24* (2013.01); *B65F 1/16* (2013.01)

(58) Field of Classification Search
CPC .......... B65F 1/02; B65F 2230/15; B65F 1/16; B65D 51/24
USPC .......................................................... 220/212
See application file for complete search history.

(56) References Cited

U.S. PATENT DOCUMENTS 2,592,255 A * 4/1952 Drees .................. A47K 10/422 232/1 R
D175,103 S * 7/1955 Boyer .......................... D11/144
D201,941 S * 8/1965 Feldman ...................... D27/125
4,166,572 A 9/1979 Leeds
4,273,392 A * 6/1981 Stinson .................. A47K 10/22 206/394
4,298,126 A * 11/1981 Filipowicz ............. A47G 21/16 248/172

(Continued)

FOREIGN PATENT DOCUMENTS

CN 2429491 5/2001
CN 2477579 2/2002

(Continued)

OTHER PUBLICATIONS

U.S. Appl. No. 29/864,944, filed Jun. 29, 2022, Tamara Wynn.

*Primary Examiner* — Ernesto A Grano
(74) *Attorney, Agent, or Firm* — Buchalter, a Professional Corporation; Siamak S. Hefazi

(57) ABSTRACT

A multifunction receptacle is described which features different combinations of lids and/or accessories. Lids are configurable to permit the user to close the open top end of the multifunction receptacle while providing decorative or utilitarian features on the lid.

17 Claims, 28 Drawing Sheets

(56) References Cited

U.S. PATENT DOCUMENTS

| | | | | |
|---|---|---|---|---|
| 5,040,679 | A * | 8/1991 | Rehmann | A47K 10/22 D6/519 |
| 5,325,962 | A * | 7/1994 | Ouellette | B65D 51/24 206/229 |
| 5,660,338 | A * | 8/1997 | Emmerson | B02C 19/0068 241/37.5 |
| 5,887,719 | A * | 3/1999 | Edwards | B65D 83/0454 206/534 |
| 6,109,429 | A * | 8/2000 | Cunningham | A47K 17/00 206/823 |
| 6,193,059 | B1 * | 2/2001 | Massaro | A47K 11/10 206/394 |
| 6,364,204 | B1 * | 4/2002 | Thomas | G07D 9/002 206/0.81 |
| 6,729,470 | B2 * | 5/2004 | Watlington | A47K 17/00 206/349 |
| 6,769,542 | B2 * | 8/2004 | Polito | A47K 10/22 206/349 |
| 7,041,261 | B2 * | 5/2006 | Margolis | A61L 2/26 215/354 |
| 7,328,792 | B1 * | 2/2008 | Benson | A45C 11/24 206/349 |
| 7,793,462 | B1 | 9/2010 | Sherette | |
| D959,172 | S * | 8/2022 | Allard | D6/551 |
| 2002/0000444 | A1 | 1/2002 | Bliss | |
| 2013/0168396 | A1 | 7/2013 | Quan | |
| 2016/0278555 | A1 * | 9/2016 | Taormina | B65D 81/366 |
| 2019/0092565 | A1 * | 3/2019 | Chenvainu | B65F 1/163 |
| 2020/0237120 | A1 | 7/2020 | Sanders | |

FOREIGN PATENT DOCUMENTS

| | | | |
|---|---|---|---|
| CN | 2735872 | Y1 | 10/2005 |
| CN | 206255478 | U | 6/2017 |
| CN | 209898940 | U | 1/2020 |
| CN | 215556075 | U | 1/2022 |
| KR | 2019920021444 | U | 12/1992 |
| KR | 102333513 | B1 | 12/2021 |

* cited by examiner

MULTI-PURPOSE DECORATIVE RECEPTACLES AND KITS

CROSS-REFERENCE

This application claims the benefit of U.S. Provisional Application No. 63/211,487, filed Jun. 16, 2021, which application is incorporated herein in its entirety by reference.

BACKGROUND

Conventionally, people place trash in receptacles positioned at various places around a work area, dwelling (e.g., bathroom or kitchen), hotels, or other areas. The trash receptacle generally has an opening for easy access to the interior of the receptacle. However, the opening often allows visitors and guests to see unsightly trash that is unpleasant as trash and/or could be embarrassing as personal.

Trashcans have evolved to include lids that can conceal the insides of the receptacle. Conventionally, lids require the user to touch a surface of the lid, such as a swinging cover, or to physically lift a lid. However, many people do not want to touch surfaces associated with trash or surfaces other people have touched while using the bathroom or performing other dirty activities such as cooking. Some trashcans use foot petals or other mechanical structures for opening the trash can and still conceal the insides of the receptacle. However, these configurations are limited in the position and access of the receptacle as the foot pedal must be accessible. The food pedal models are also usually too big for many locations, and/or are susceptible to breaking after a short period.

Additionally, small spaces require users to either forego decorative or functional items or create a cluttered space by adding additional functional items into the space.

What is needed is a trash receptacle that is easily usable, fits within a small space and allows a user to achieve multiple functionality.

SUMMARY

Disclosed are multifunction receptacles that are easily usable and configured to fit within a small space. Additionally the disclosed multifunction receptacles allows a user to achieve multiple functionality with a single device. The multifunction receptacle has a three dimensional shape with a variety of cross-sectional shapes. A lid is provided that releasably engages an accessory. Foot petals or other mechanical structures can be provided for opening the lid from the body of the receptacle.

The disclosed multifunction receptacles function to serve many roles in the home, office, place of business, or hotels. The multifunction receptacles can also be provided in a kit form with one or more accessories. The kits can include a receptacle, a lid and one or more accessories.

Both the foregoing general description and the following detailed description are exemplary and explanatory only and are not restrictive of the disclosed embodiments, as claimed.

INCORPORATION BY REFERENCE

All publications, patents, and patent applications mentioned in this specification are herein incorporated by reference to the same extent as if each individual publication, patent, or patent application was specifically and individually indicated to be incorporated by reference.

CN 206255478 U published Jun. 16, 2017, by Wenzhou Business College;
CN 215556075 U published Jan. 18, 2022, by MA;
CN 2429491 Y published May 9, 2001, by FEI;
CN 2477579 Y published Feb. 20, 2002, by HUANG;
CN 2735872 Y published Oct. 26, 2005, by TAN;
KR 2333513 B1 published Dec. 1, 2021, by LEE; and
US 2002/0000444 A1 published Jan. 3, 2002, by Bliss.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

A wastebasket, or trash container, laundry basket, or multifunction receptacle is described that has a lid with a functional component incorporated or provided. The multifunction receptacle has a horizontal base and at least one vertical side wall with an upper opening to define a three-dimensional interior cavity for receiving items. The upper opening provides a hygienic way for users to dispose of trash because the user does not need to touch any surfaces, thereby reducing the risk of exposure to germs. The configuration helps to reduce exposure to germs in public places like restaurants and restrooms. The multifunction receptacle can have a continuous planar cross-sectional shape along the height of the receptacle or a variable cross-section. The side wall can be continuous (e.g., one wall formed into a desired cross-sectional shape by, for example curving the side wall or forming a plurality of bends in the side wall), or multiple connected side wall (e.g., vertical sheets connected at seams).

The functional component can, for example, for formed as part of the lid in some embodiments, or can be removably attached in other embodiments. Where the functional component is removably attached, the user can change the functional component as desired or as needs within a space change. Providing a multifunction receptacle with a lid that, for example, doubles as a vase, diffuser, or other accessory or useful item provides an efficient use of space in situations where counter space may be limited. As will be appreciated, removing an accessory from limited counter space and securing it to an otherwise unused surface not only saves valuable space but reduces the potential to knock over the accessory, e.g., when a user reaches for the sink, soap, or hand towels. The stability of the accessory secured to the lid helps ground the accessory.

The design may also allow a user to toss an article, such as trash or laundry, into the multifunction receptacle without touching any surfaces associated with the multifunction receptacle, such as a swinging lid or a lifting top.

Additionally, persons of skill in the art will understand that the lid configurations are not limited to the accessories described. Other containers or objects can also be incorporated without departing from the scope of the disclosure such as storage containers or shelves.

Figure 1A:
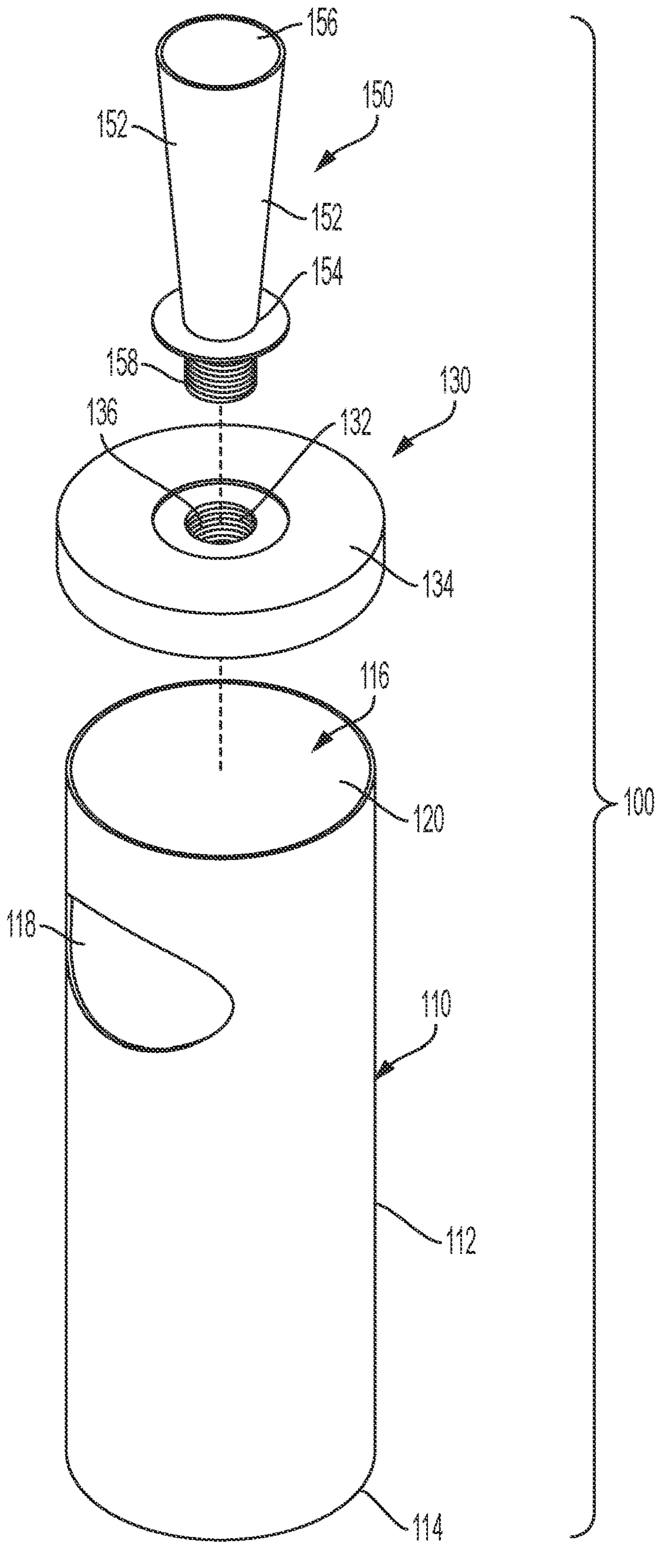
FIGS. 1A-I illustrates an exemplary trash container from a variety of perspectives.
Figure 1B:
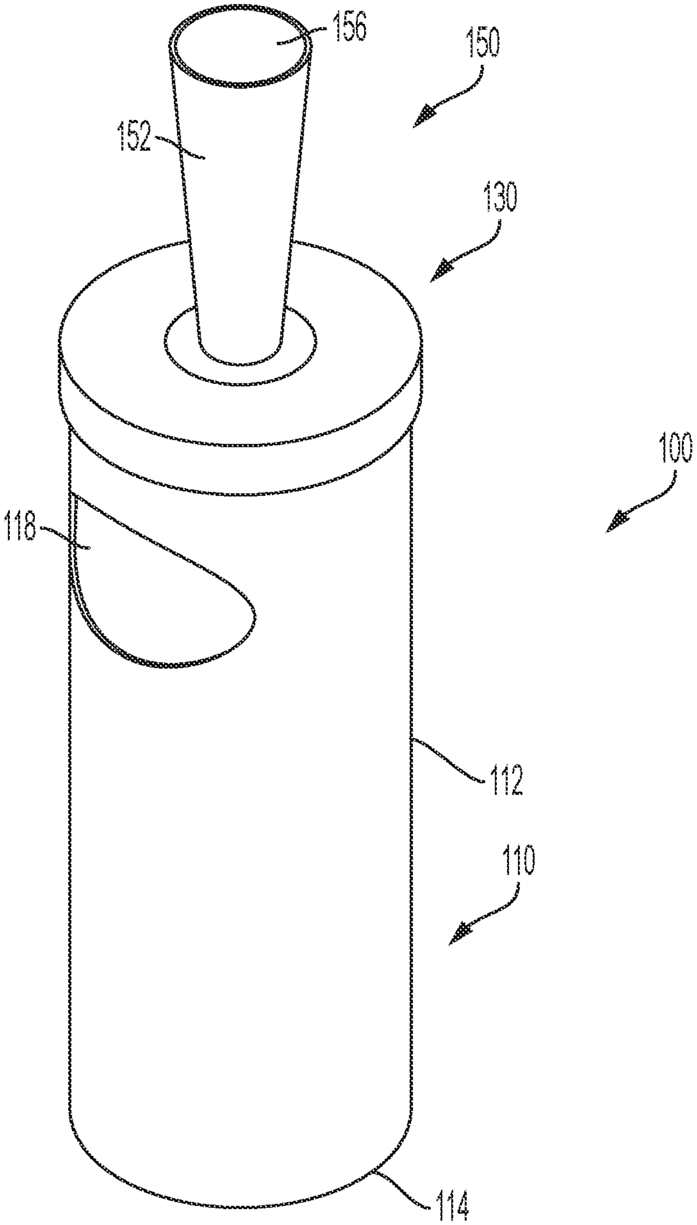
Figure 1C:
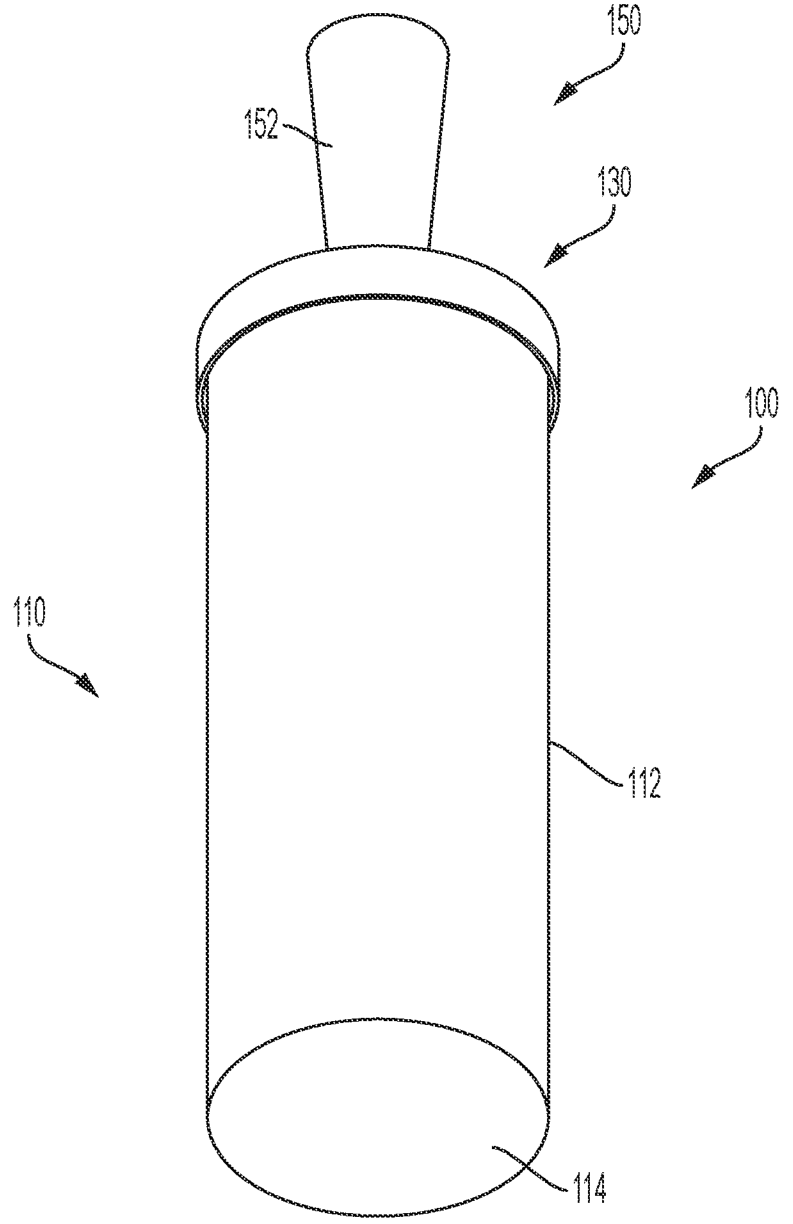
Figure 1D:
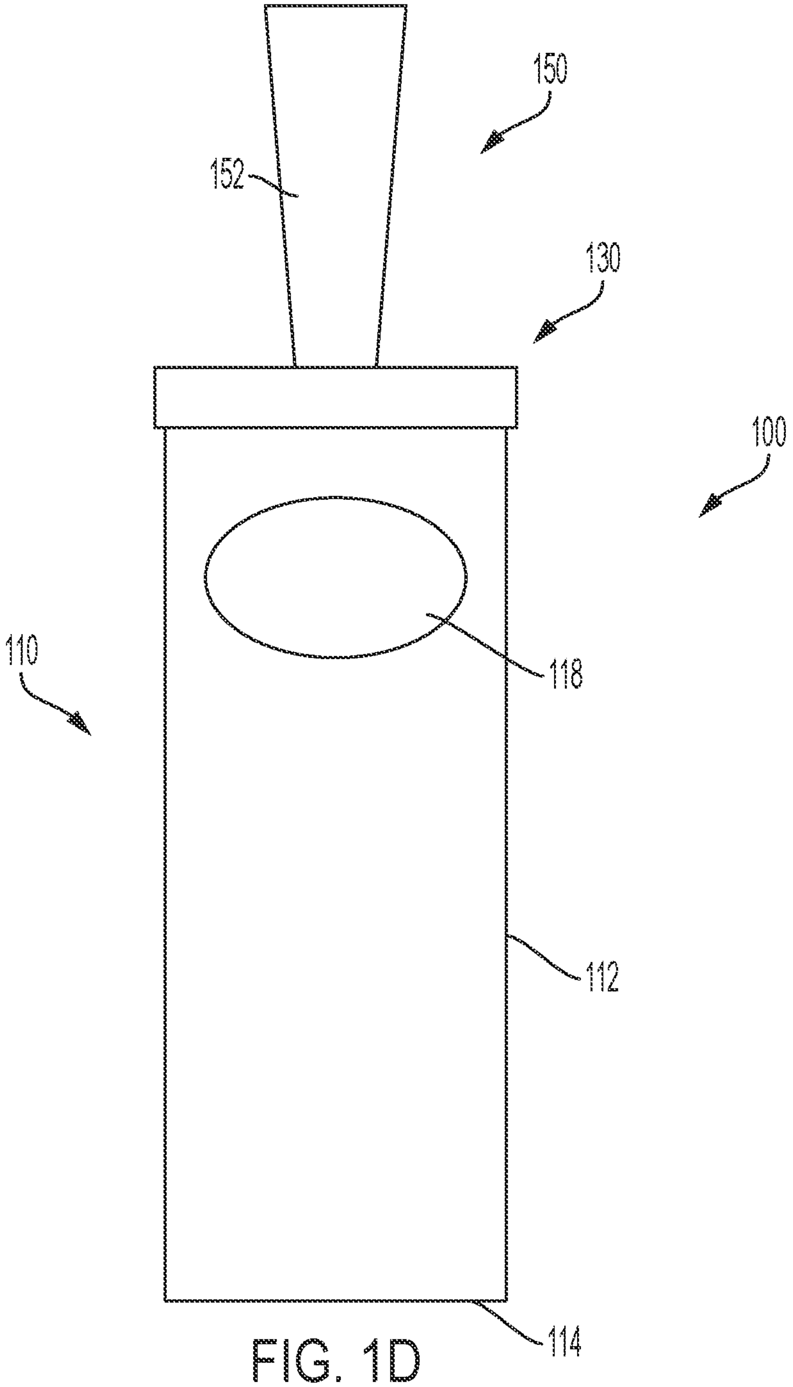
Figure 1E:
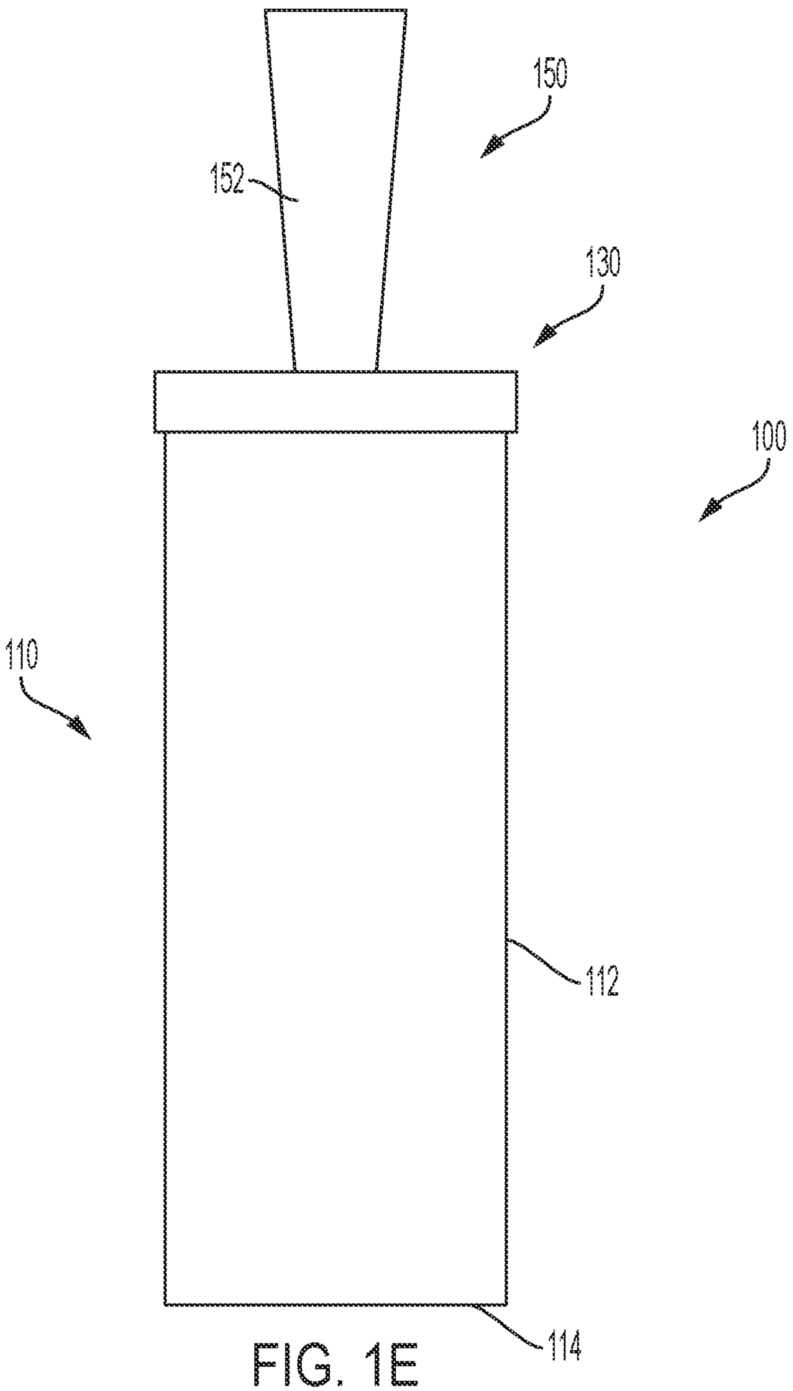
Figure 1F:
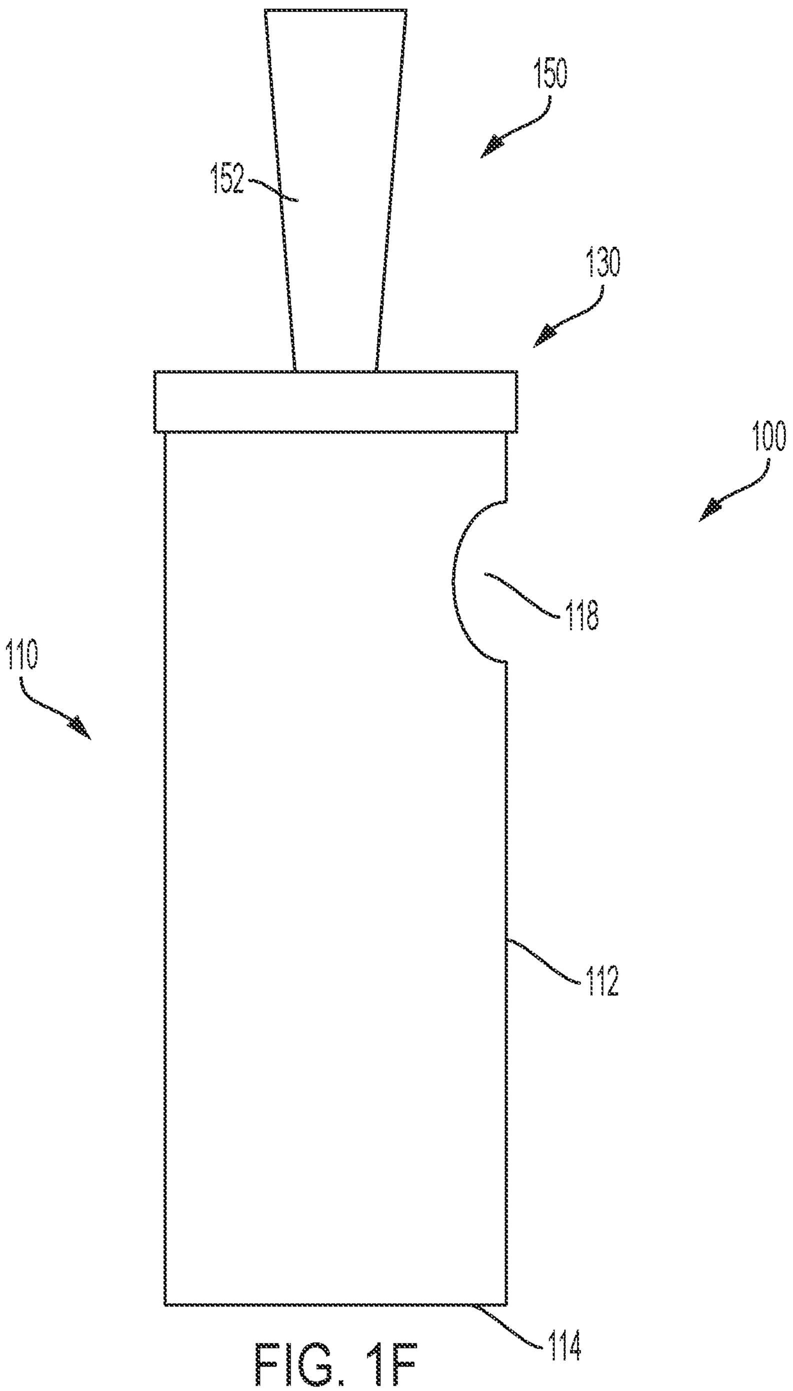
Figure 1G:
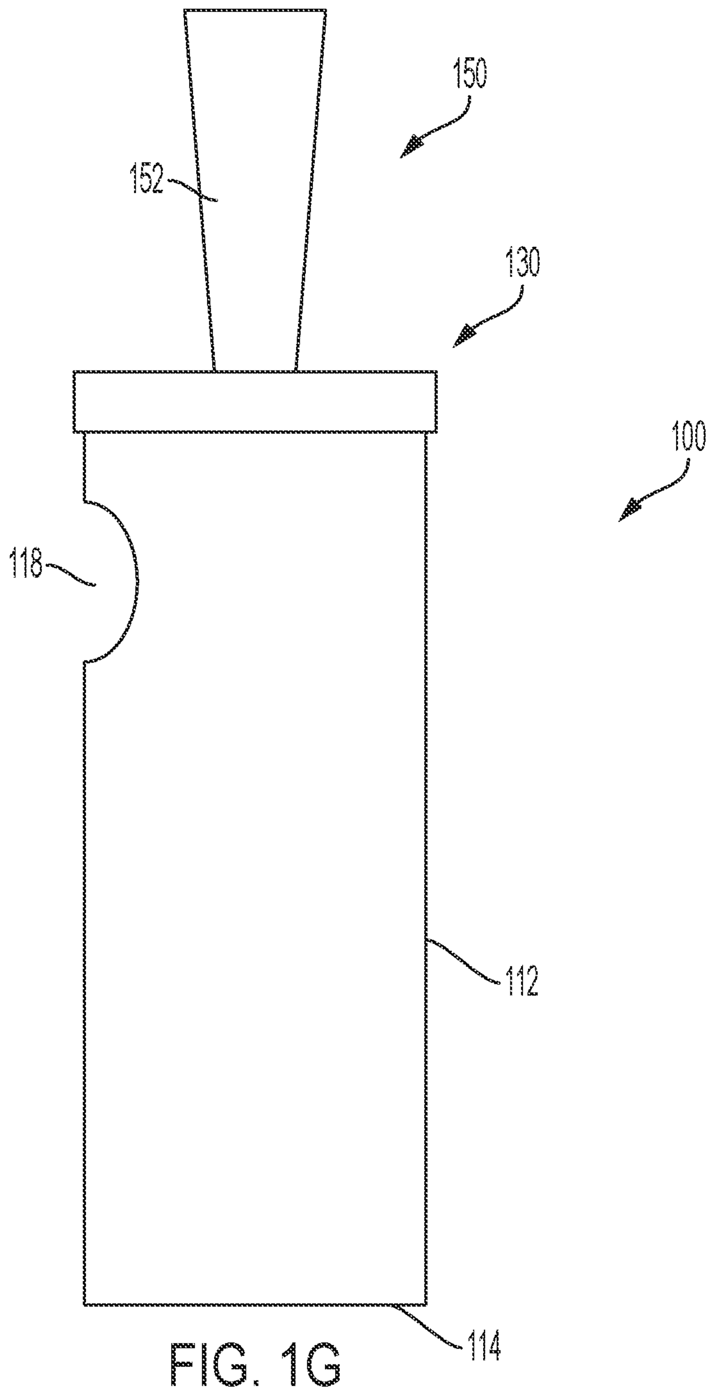
Figure 1H:
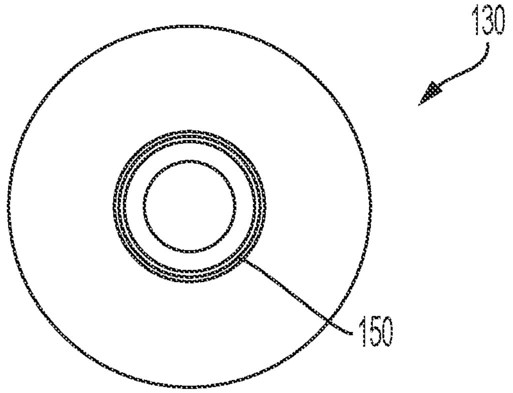
Figure 1I:
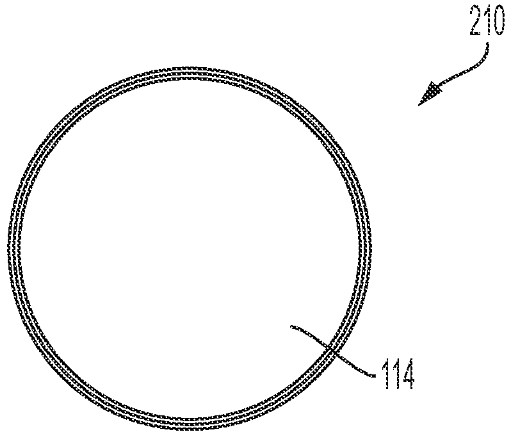

Turning now to FIGS. 1A-I, a first embodiment of an exemplar multifunction receptacle 100 is illustrated from an exploded view (FIG. 1A), a top perspective view (FIG. 1B), a bottom perspective view (FIG. 1C), a front view (FIG. 1D), a back view (FIG. 1E), a first side view (FIG. 1F), a second side view (FIG. 1G), a top view (FIG. 1H) and a bottom view (FIG. 1I).

The multifunction receptacle 100 includes an article receptacle 110 and a lid 130. The lid 130 may also have a removable accessory, such as a vase 150. The article receptacle 110 has a vertical side wall 112 and a horizontal base 114. The vertical side wall 112 and the horizontal base 114 define an interior cavity 116 or space operable to receive, for example, trash. The interior cavity 116 is accessible via one or more of a side opening 118 and an upper opening 120. The side opening 118 can be positioned along an exterior surface of the article receptacle 110 to allow items, such as trash, to be placed within the interior space of the article receptacle 110.

In this configuration, the article receptacle 110 has a tubular configuration with a constant diameter and a height. In other configurations, the tubular configuration could have a greater diameter near the base and a smaller diameter near the top, or a variable diameter along the height.

The lid 130 is configured to be placed on top of the article receptacle 110. The lid 130 can be a flat disc having the same diameter as the article receptacle 110 or can have a diameter larger than the article receptacle 110 and a lip that extends from a lower surface to engage an out wall of the article receptacle 110 when the lid 130 is placed on the article receptacle 110.

The lid 130 can also include an accessory interface such as a female lid aperture 132 on an upper surface 134. The female lid aperture 132 can be centrally positioned, as shown, or positioned offset to the center. The female lid aperture 132 can be partially threaded 136 within its interior surface or fully threaded. Additionally, the female lid aperture 132 can be threaded or provide other securement mechanisms, such as a detent or latch. The female lid aperture 132 can also pass through the entire lid 130 or only pass through part of the lid 130.

An removably securable accessory, such as a vase 150, can be provided. The vase 150 has a vertical vase side wall 152 and a lid interface accessory surface 154. The vertical vase side wall 152 and the lid interface accessory surface 154 define an interior vase cavity 156 or space operable to receive, for example, flowers. A threaded male extension 158 can be provided on the lower surface that is operable to thread into the female lid aperture 132.

Figure 2A:
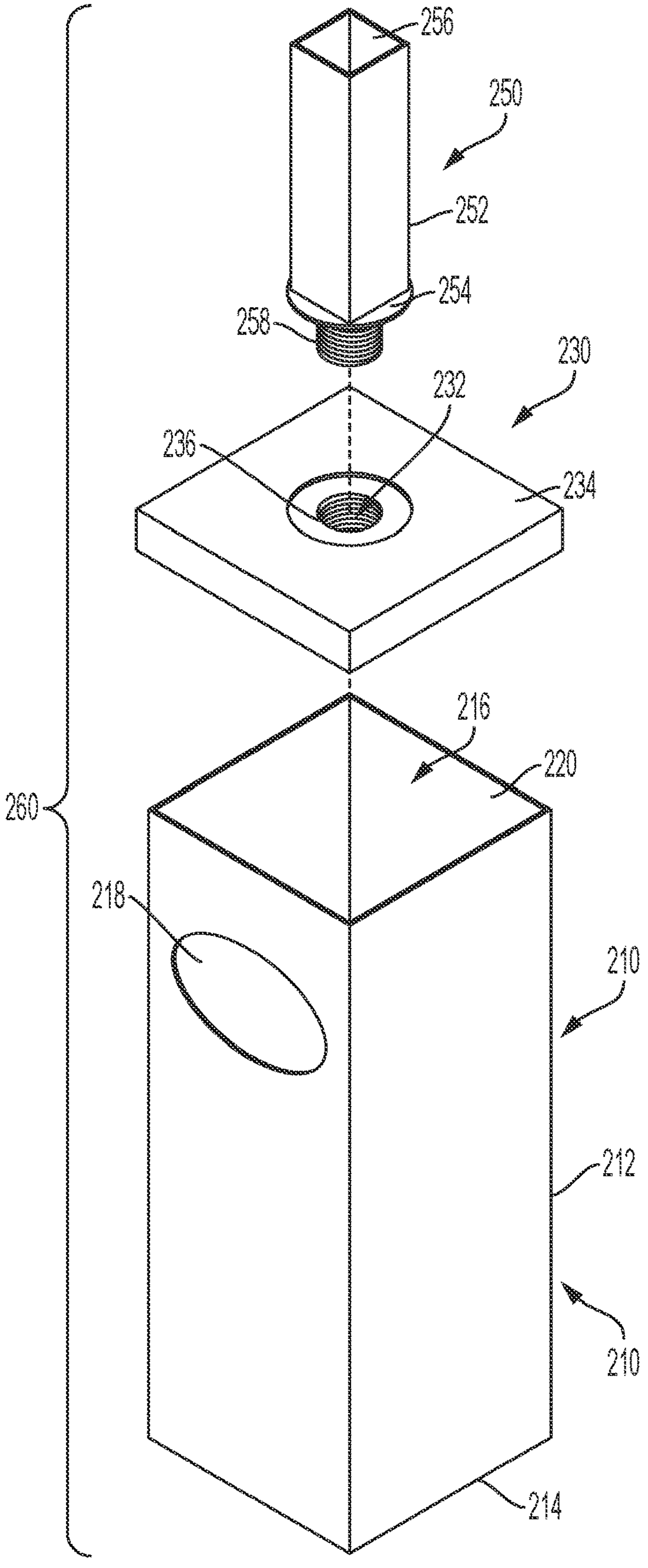
FIGS. 2A-I illustrates another exemplary trash container from a variety of perspectives.
Figure 2B:
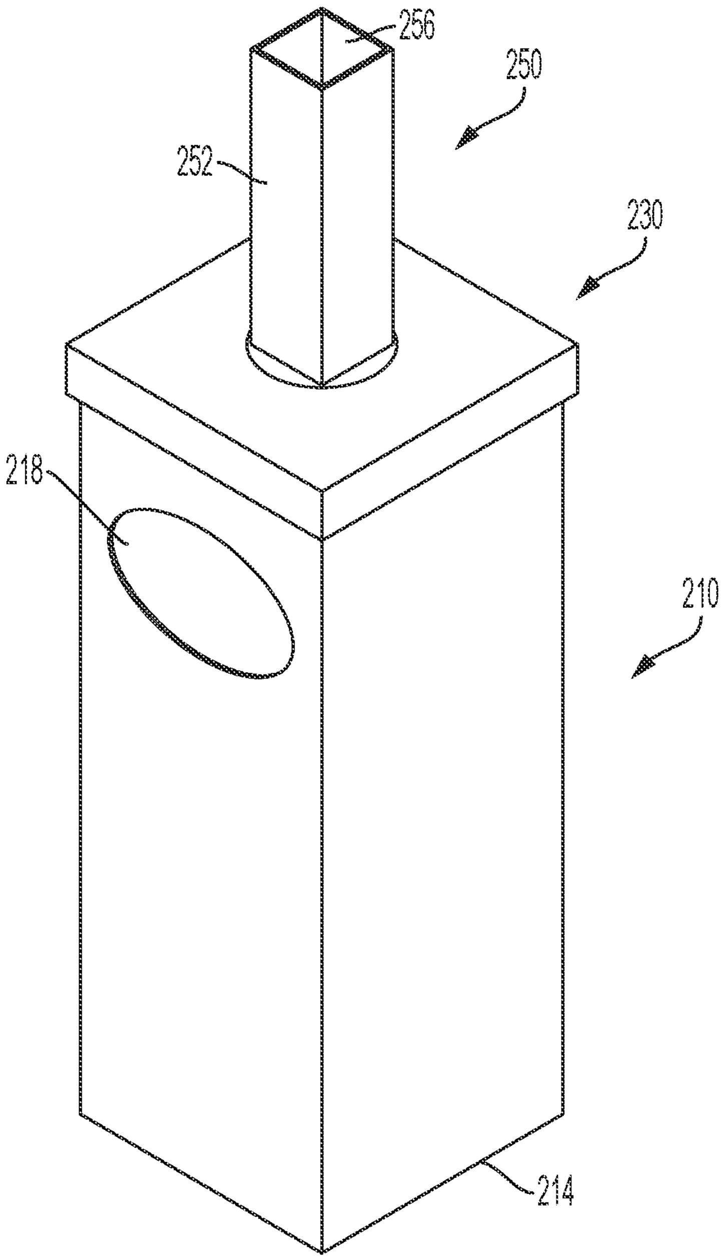
Figure 2C:
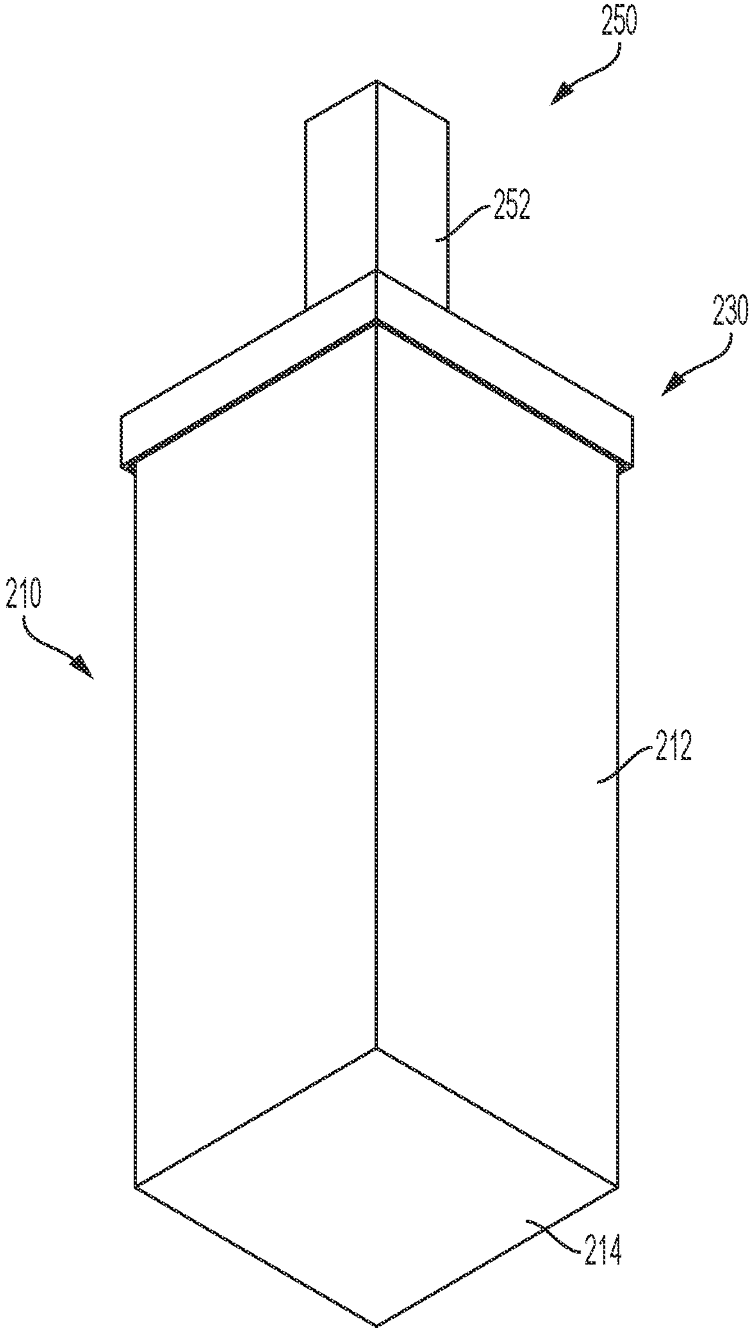
Figure 2D:
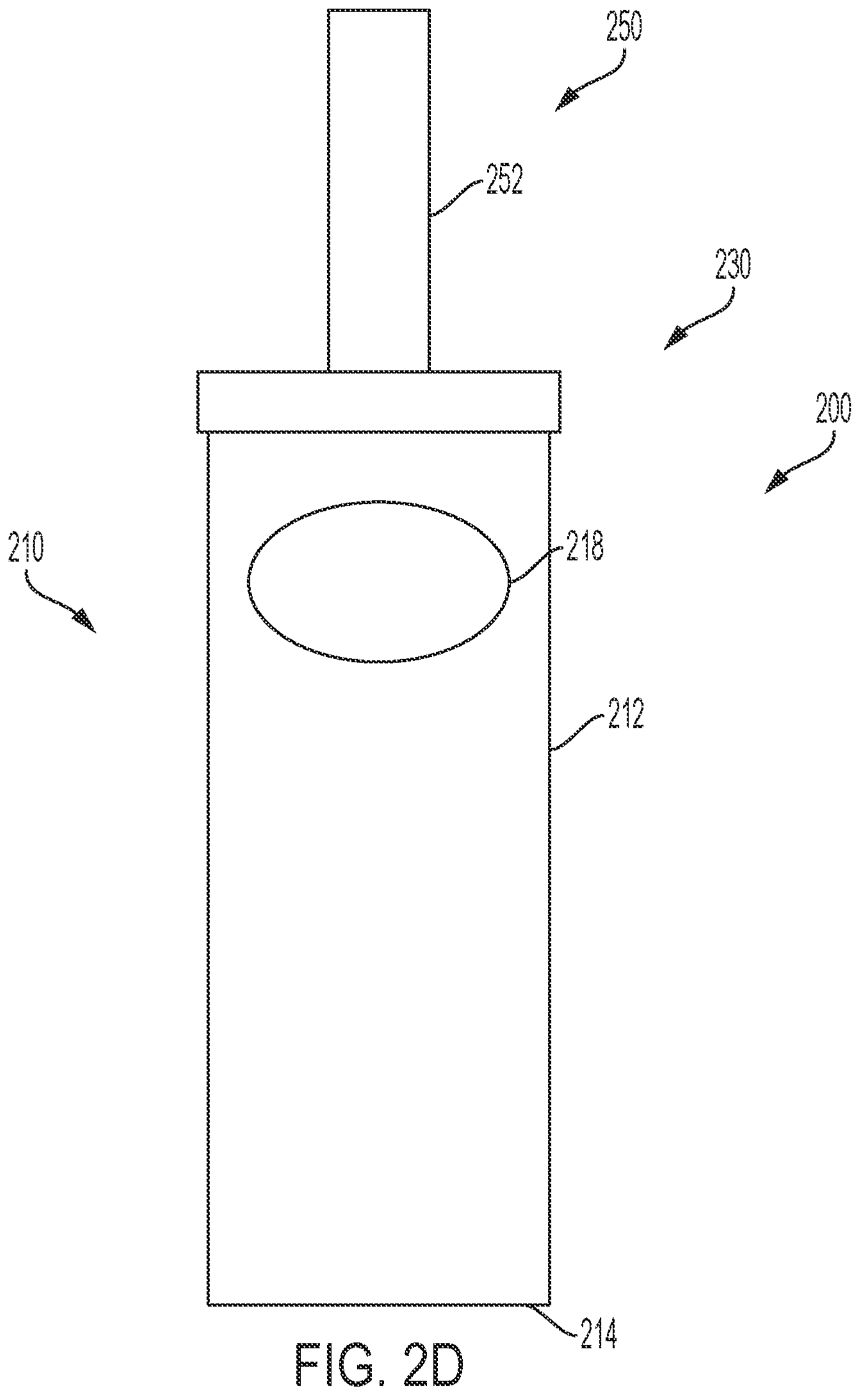
Figure 2E:
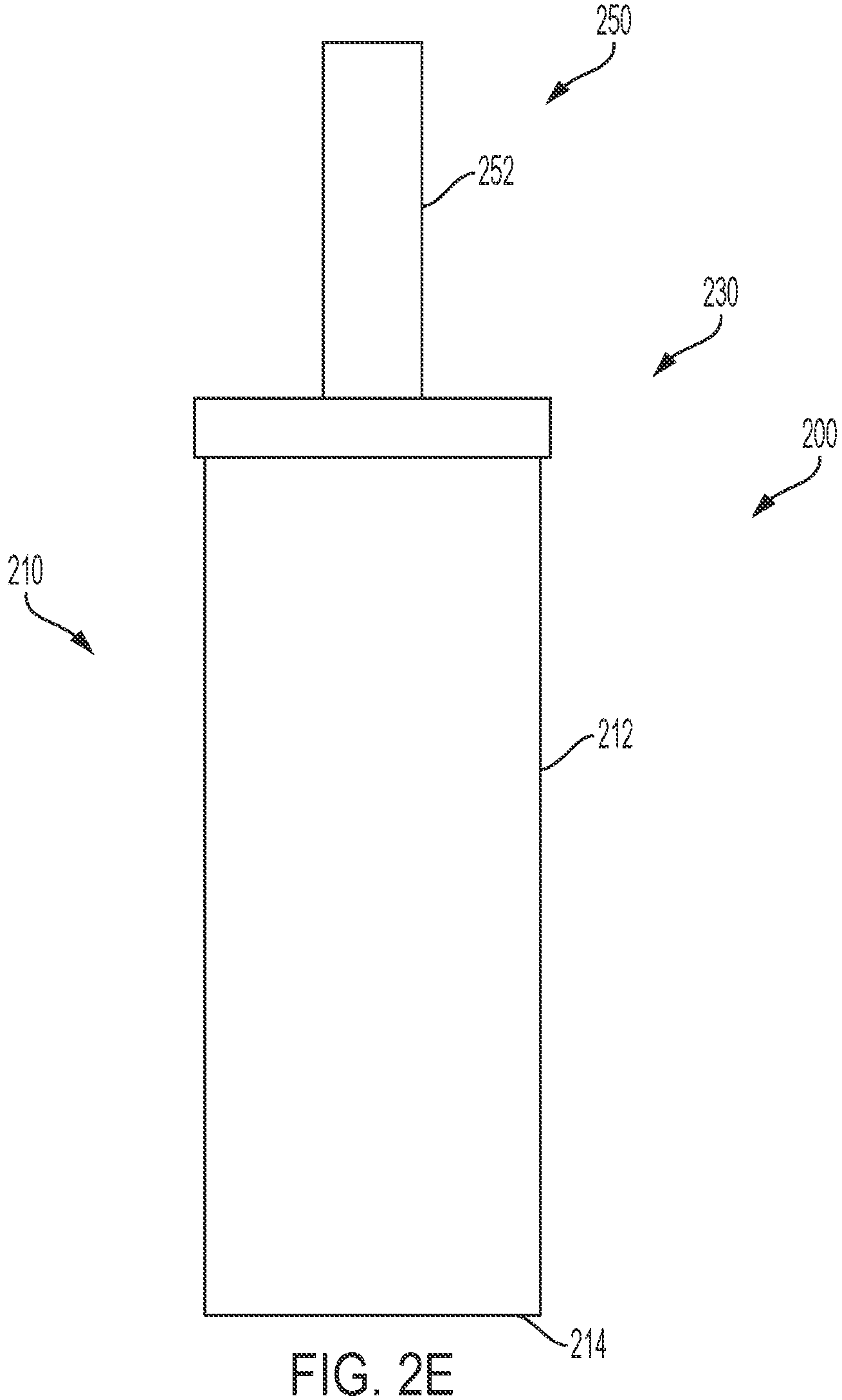
Figure 2F:
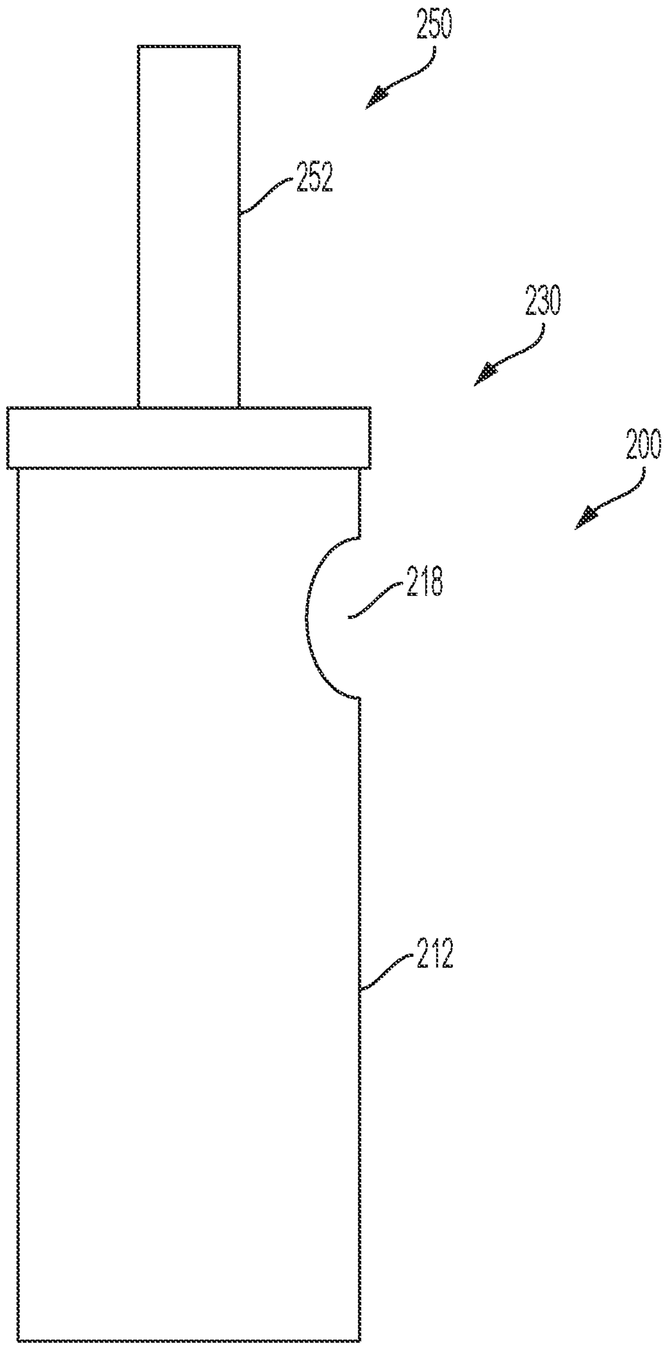
Figure 2F:
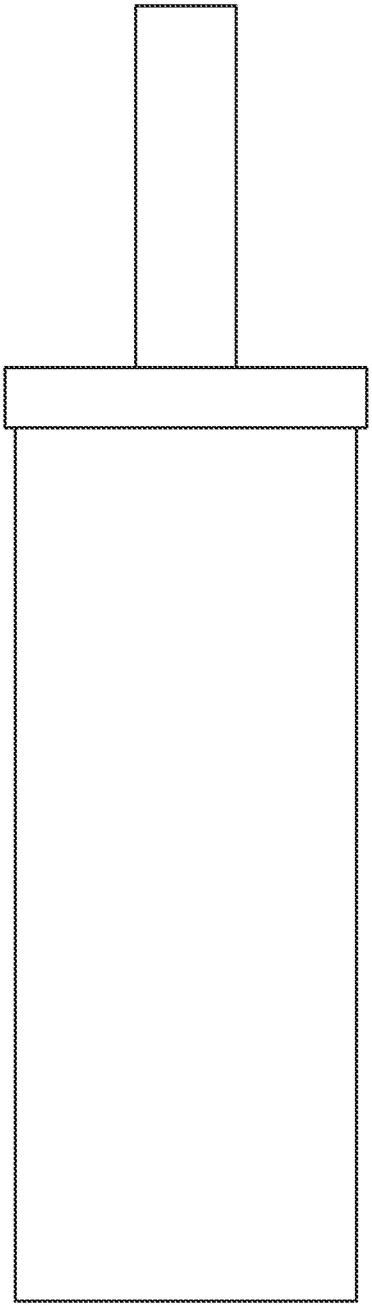
Figure 2G:
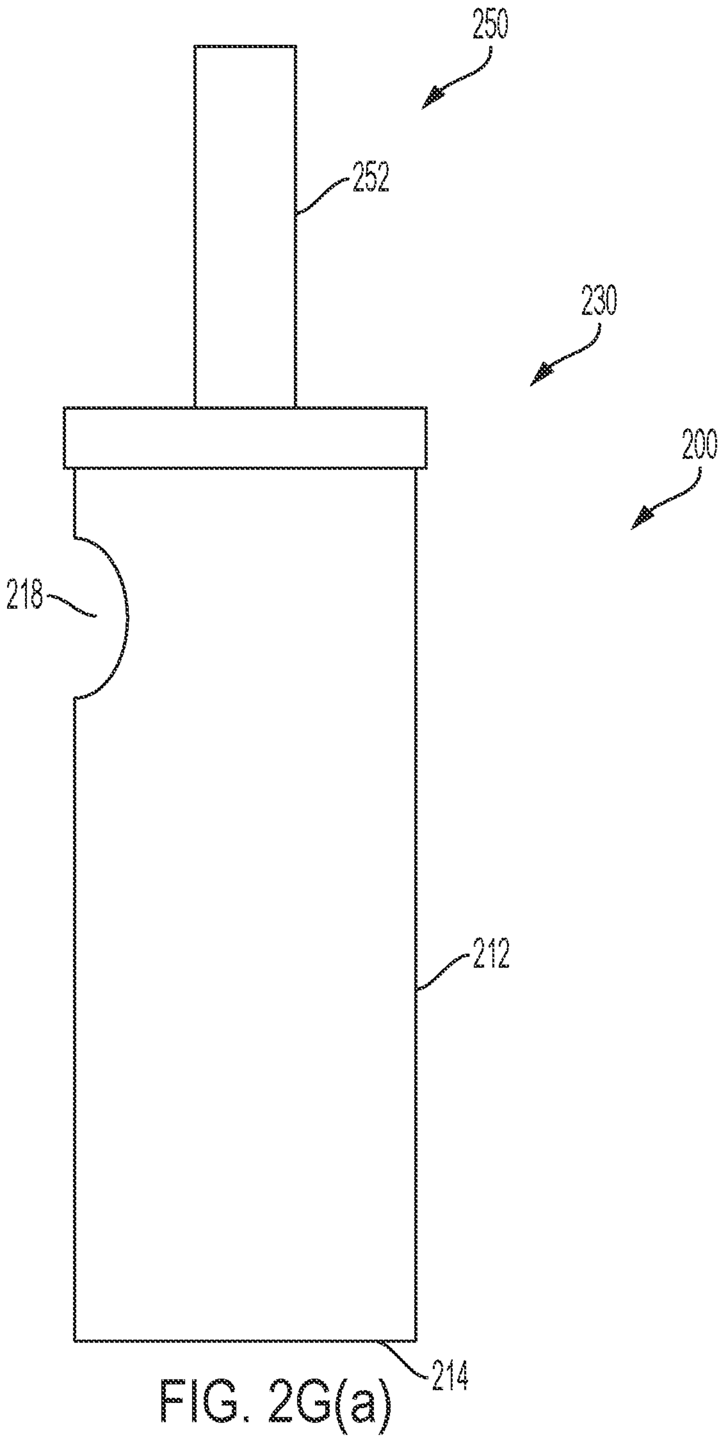
Figure 2G:
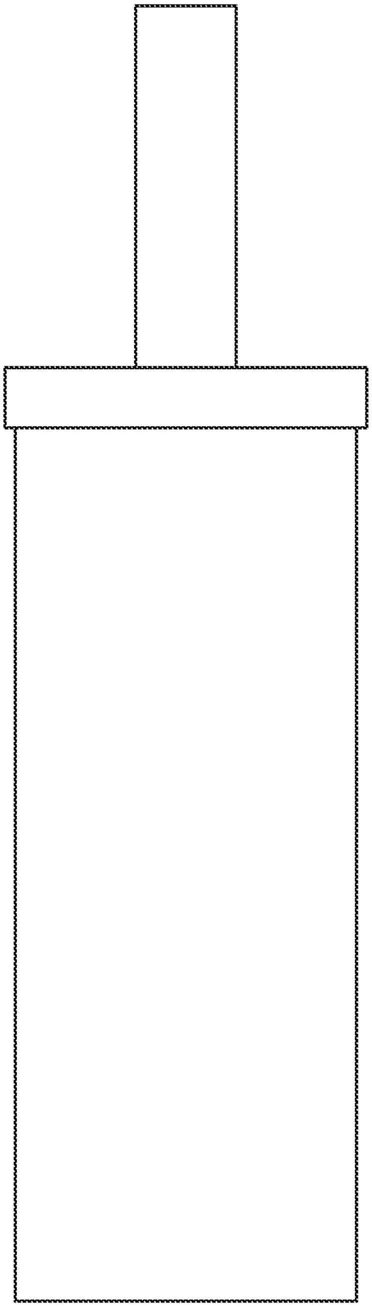
Figure 2H:
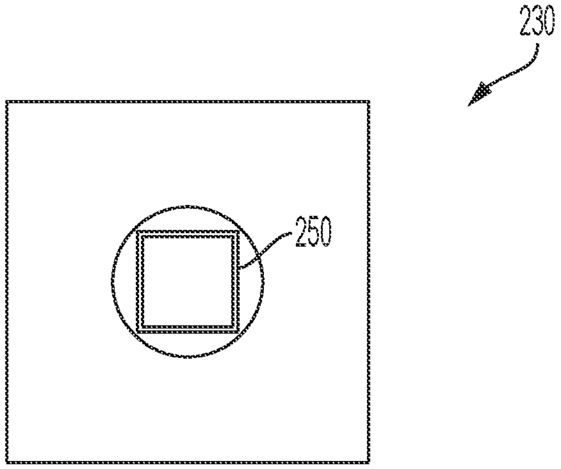
Figure 2I:
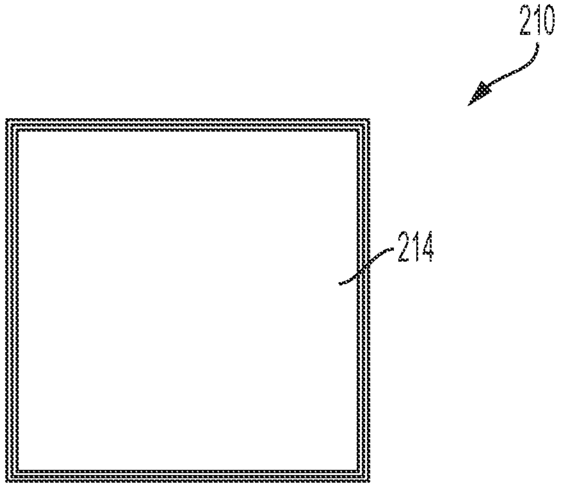

Turning now to FIGS. 2A-I, another embodiment of an exemplar multifunction receptacle 200 is illustrated from an exploded view (FIG. 2A), a top perspective view (FIG. 2B), a bottom perspective view (FIG. 21C), a front view (FIG. 2D), a back view (FIG. 2E), a first side view (FIG. 2F(a) and FIG. 2F(b)), a second side view (FIG. 2G(a) and FIG. 2G(b)), a top view (FIG. 2H) and a bottom view (FIG. 2I).

The multifunction receptacle 200 includes an article receptacle 210 and a lid 230. The lid 230 may also have a removable accessory, such as a vase 250. The article receptacle 210 has a plurality of vertical side walls 212 and a horizontal base 214. The plurality of vertical side walls 212 and the horizontal base 214 define an interior cavity 216 or space operable to receive, for example, trash. The interior cavity 216 is accessible via one or more of a side opening 218 and an upper opening 220. The side opening 218 can be positioned along an exterior surface of the article receptacle 210 to allow items, such as trash, to be placed within the interior space of the article receptacle 210. In some configurations, the side opening 218 is viewable from a front view and a side view (see, for example, FIGS. 2D, 2F(a) and 2G(a)). In other configurations, the side opening 218 is only viewable from one aspect (see, for example, FIGS. 2D, 2F(b) and 2G(b)).

In this configuration, the article receptacle 210 has a square configuration (i.e., four vertical walls formed at 90 degree angles) with a constant diameter and a height.

The lid 230 is configured to be placed on top of the article receptacle 210. The lid 230 can be a flat disc having the same diameter as the article receptacle 210 or can have a diameter larger than the article receptacle 210 and a lip that extends from a lower surface to engage an out wall of the article receptacle 210 when the lid 230 is placed on the article receptacle 210.

The lid 230 can also include a lip aperture 232 on an upper surface 234. The lid aperture 232 can be centrally positioned, as shown, or positioned offset to the center. The lid aperture 232 can be partially threaded 236 within its interior surface or fully threaded. Additionally, the lid aperture 232 can be threaded or provide other securement mechanisms, such as a detent or latch. The lid aperture 232 can also pass through the entire lid 230 or only pass through part of the lid 230.

An accessory, such as a vase 250, can be provided. The accessory can be formed integrally with the lid or be separable from the lid as shown. The vase 250 has a plurality of vertical vase side walls 252 and a lid interface accessory surface 254. The plurality of vertical vase side walls 252 and the lid interface accessory surface 254 define an interior vase cavity 256 or space operable to receive, for example, flowers. A threaded extension 258 can be provided on the lower surface that is operable to thread into the lid aperture 232.

Figure 3A:
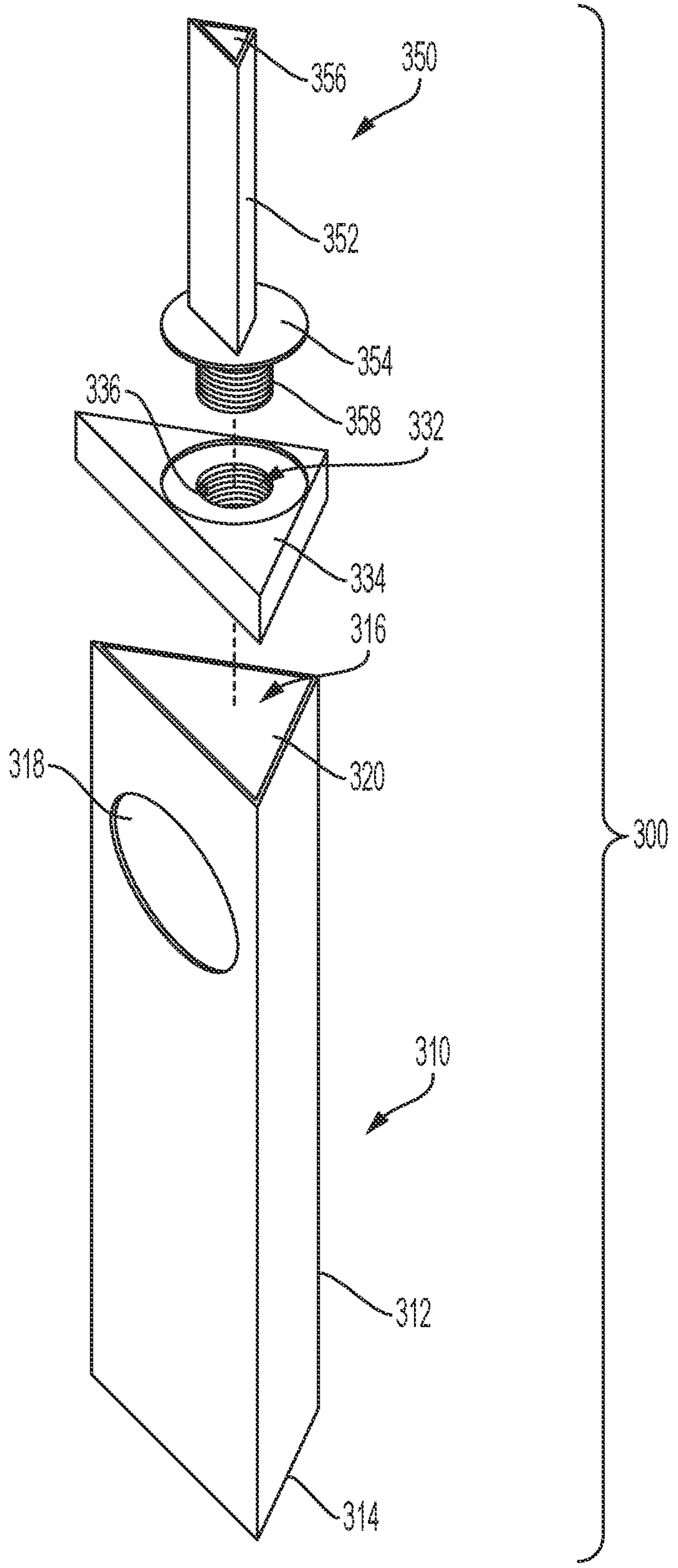
FIGS. 3A-I illustrates an another exemplary trash container from a variety of perspectives.
Figure 3B:
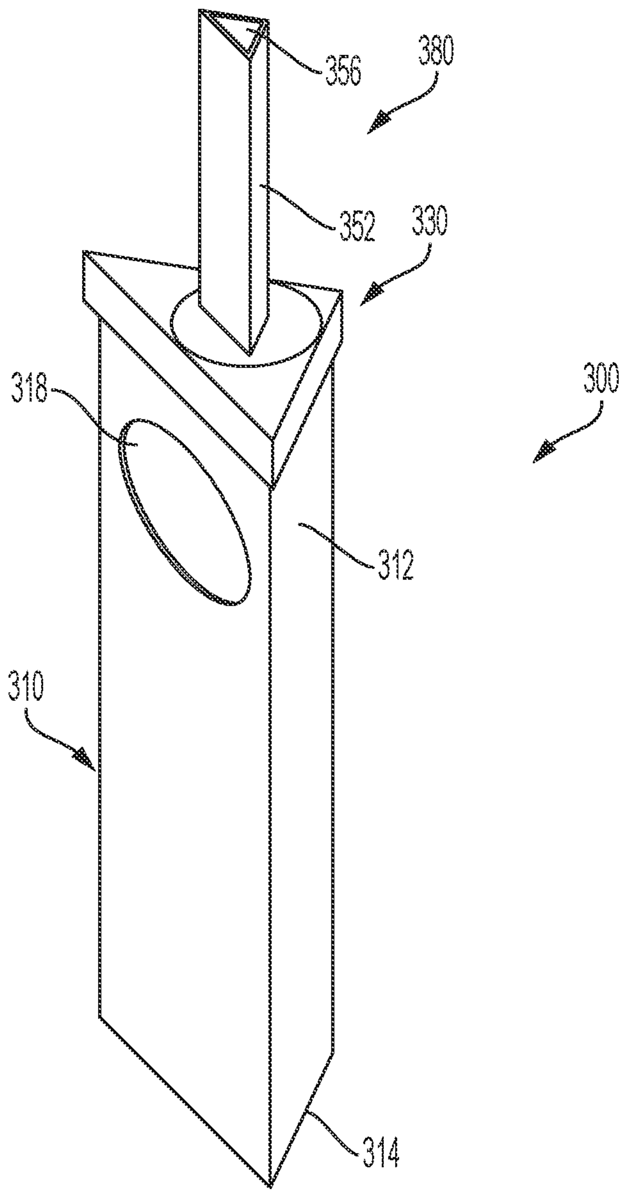
Figure 3C:
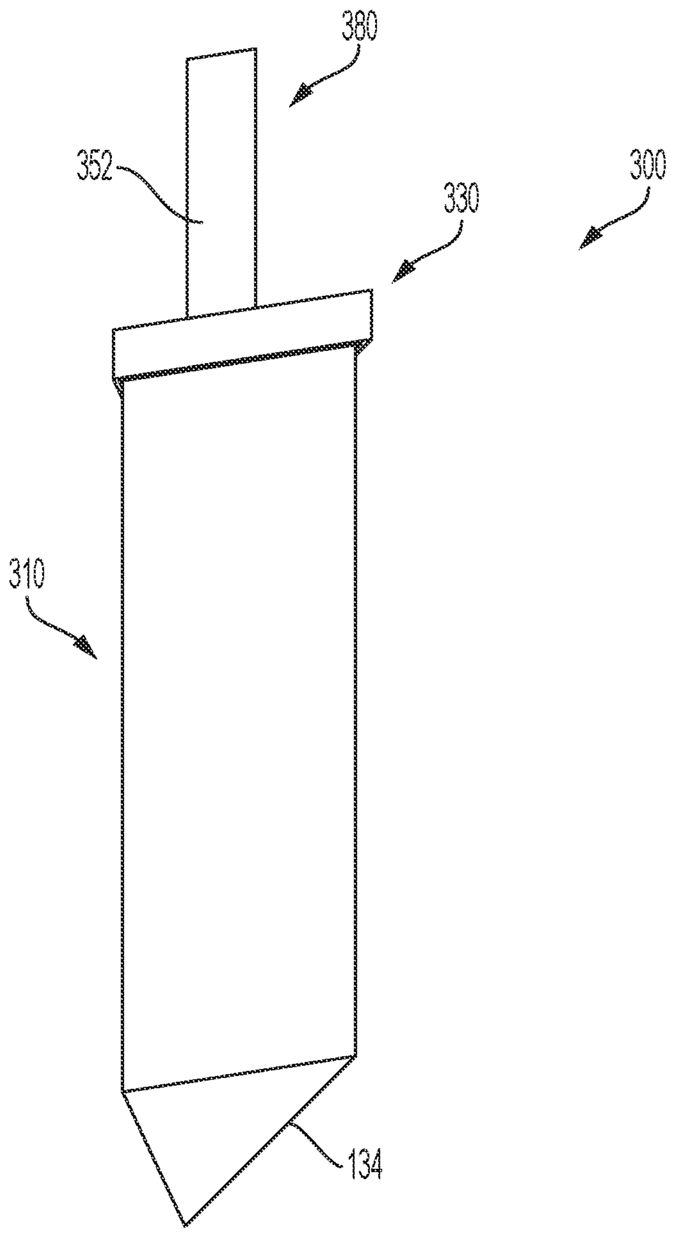
Figure 3D:
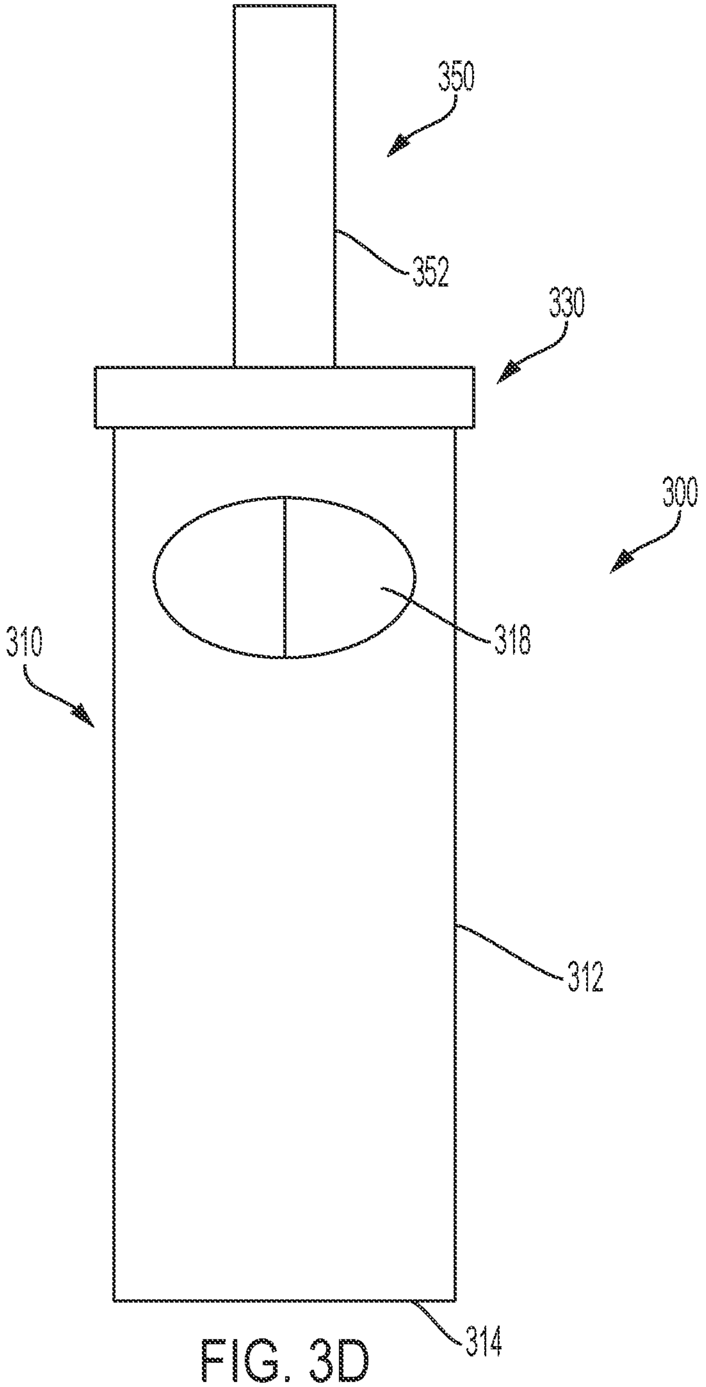
Figure 3E:
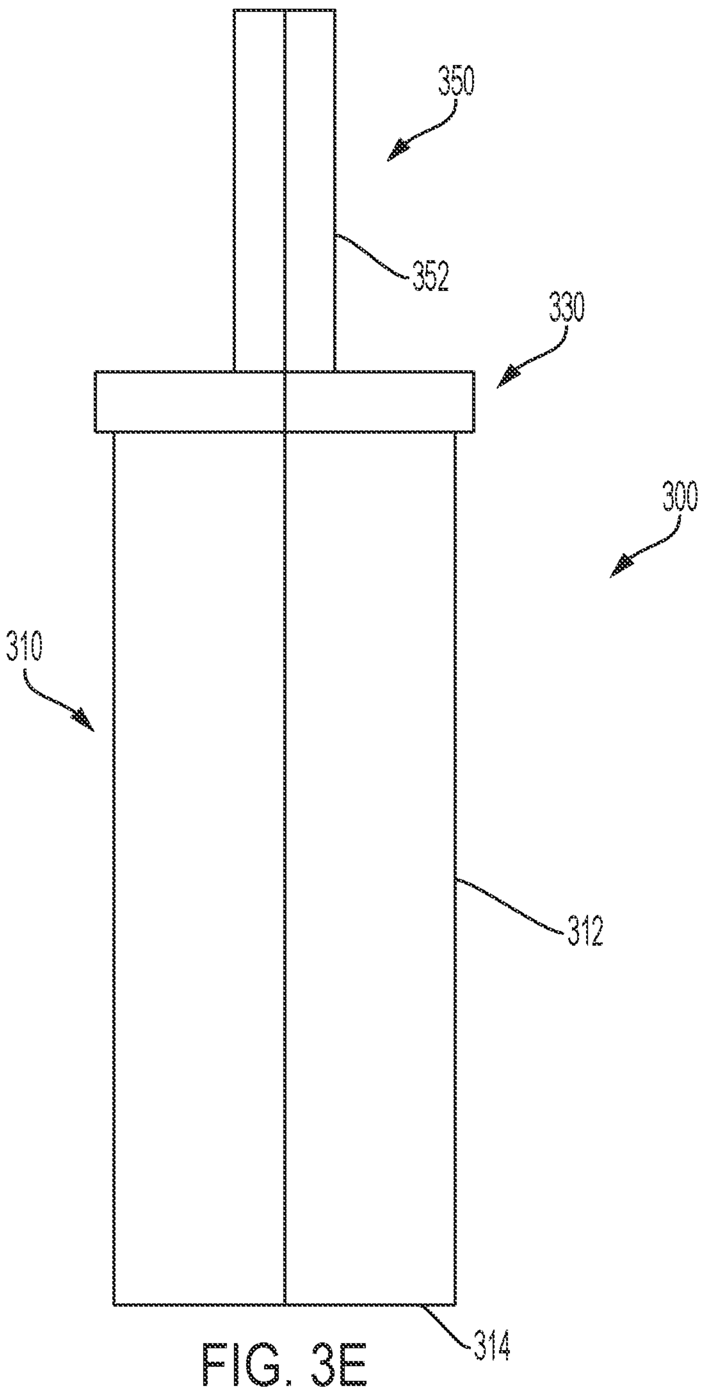
Figure 3F:
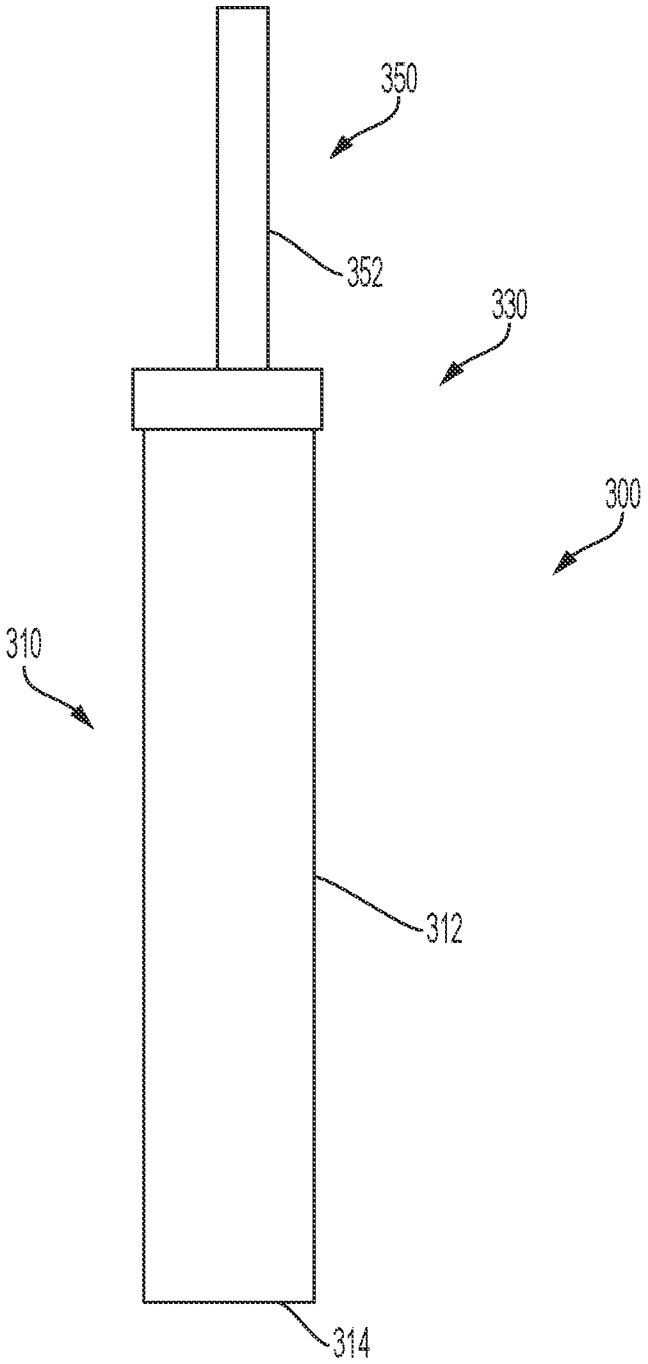
Figure 3G:
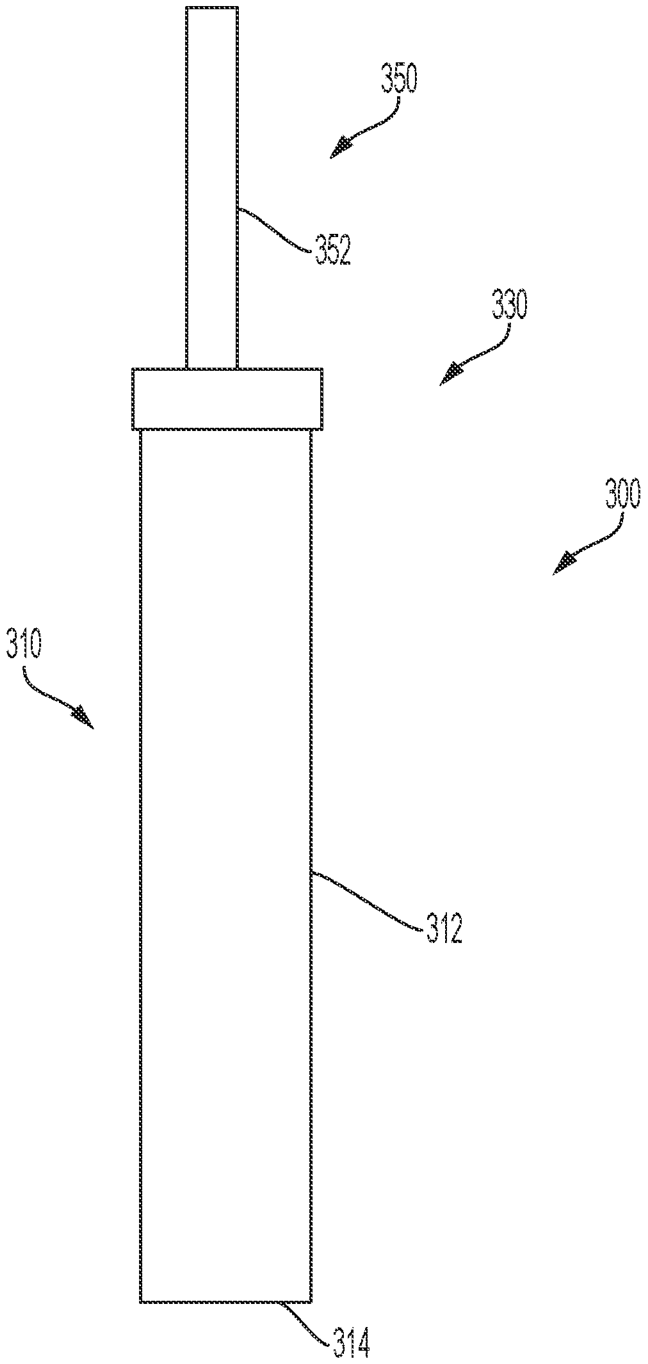
Figure 3H:
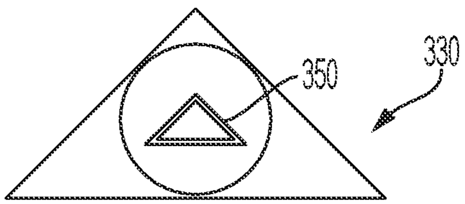
Figure 3I:
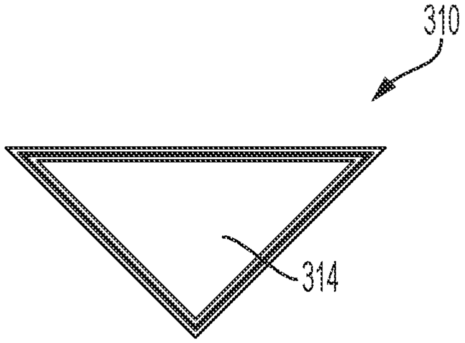

Turning now to FIGS. 3A-I, a first embodiment of an exemplar multifunction receptacle 300 is illustrated from an exploded view (FIG. 3A), a top perspective view (FIG. 3B), a bottom perspective view (FIG. 3C), a front view (FIG. 3D), a back view (FIG. 3E), a first side view (FIG. 3F), a second side view (FIG. 3G), a top view (FIG. 3H) and a bottom view (FIG. 3I).

The multifunction receptacle 300 includes an article receptacle 310 and a lid 330. The lid 330 may also have a removable accessory, such as a vase 350. The article receptacle 310 has a plurality of vertical side walls 312 and a horizontal base 314. The plurality of vertical side walls 312 and the base 314 define an interior cavity 316 or space operable to receive, for example, trash. The interior cavity 316 is accessible via one or more of a side opening 318 and an upper opening 320. The side opening 318 can be positioned along an exterior surface of the article receptacle 310 to allow items, such as trash, to be placed within the interior space of the article receptacle 310. In this configuration, the article receptacle 310 has a triangular configuration (i.e., three vertical walls) with a constant diameter and a height.

The lid 330 is configured to be placed on top of the article receptacle 310. The lid 330 can be a flat disc having the same shape in a plane and diameter as the article receptacle 310 or can have a diameter larger than the article receptacle 310 and a lip that extends from a lower surface to engage an out wall of the article receptacle 310 when the lid 330 is placed on the article receptacle 310.

The lid 330 can also include a lid aperture 332 on an upper surface 334. lid aperture 332 can be centrally positioned, as shown, or positioned offset to the center. The lid aperture 332 can be partially threaded 336 within its interior surface or fully threaded. Additionally, the lid aperture 332 can be threaded or provide other securement mechanisms, such as a detent or latch. The lid aperture 332 can also pass through the entire lid 330 or only pass through part of the lid 330.

An accessory, such as a vase 350, can be provided. The accessory can be formed integrally with the lid or be separable from the lid as shown. The vase 350 has a plurality of vertical vase side walls 352 and a lid interface accessory surface 354. The plurality of vertical vase side walls 352 and the lid interface accessory surface 354 define an interior vase cavity 356 or space operable to receive, for example, flowers. A threaded extension 358 can be provided on the lower surface that is operable to thread into the lid aperture 332.

The multifunction receptacle can have a wide variety of cross-sectional shapes. From the illustrations show in FIGS. 1-3, it will be appreciated that the cross-section of the multifunction receptacle and/or vase accessory can be round, oval, egg shaped, triangular, square, rectangular, pentagonal, septagonal, octagonal, etc. without departing from the scope of the disclosure. The cross-section of the multifunction receptacle can be the same as or different than the accompanying accessory (e.g., vase). Either the multifunction receptacle or accessory can have a constant cross-section or a variable cross-section. Additionally, the multifunction receptacle and/or accessory can be tapered to provide more space in the bottom than the top.

The side aperture on the article receptacle can be oval, as illustrated, or any other shape that is desirable including, but not limited to square, rectangular, triangular, octagonal, round, etc. The side aperture can be positioned at any location along the side of the article receptacle. As illustrated, the side aperture is positioned near the upper opening of the article receptacle.

The upper opening permits easy access to the interior of the multifunction receptacle, such as for emptying the article receptacle after use, accessing an interior liner or basket, or inserting a flexible bag.

In other configurations, the geometric configuration of the multifunction container and accessory could have a greater diameter near the base and a smaller diameter near the top, or a variable diameter along the height. Additionally, the cross-sectional shape of the multifunction container and/or accessory can be oval, ovoid, rectangular, diamond, right triangle, obtuse triangle, or acute triangle, without departing from the scope of the disclosure.

An additional removable receptacle (not shown) or liner can be provided. The removable receptacle can be sized to fit within the article receptacle with a height less than the article receptacle, or a height that terminates below a lower edge of the side opening. Additionally, the removable receptacle, could for example, support a trash bag liner at a height below the side opening. In an alternative configuration, a ring or plurality of anchors can be provided on the interior surface of the article receptacle below the side opening to secure a trash bag lined within the article receptacle.

The lid may include a second impression or recess around and fully circumscribing the lid aperture. The recess may be configured to seat or retain a portion of an accessory. An interior surface of the recess may comprise a mated surface for coupling to a corresponding mating surface of the accessory when the accessory is installed. The lid may also be configured to present a storage space between the upper surface and an interior lid lower surface that interfaces with the upper side walls of the article receptacle. Additionally, as illustrated, the interior surface is of the lid aperture is threaded. However, other interfaces can be employed, such as indent/detent, friction, textured, ribs, insert and turn to lock, etc., without departing from the scope of the disclosure.

The vase accessory may have a closed bottom end and side walls extending away from the closed bottom end that defines a vase interior cavity. The closed bottom end and the sidewalls may be configured to hold water and/or stems of flowers or other decorative object. Although flowers are disclosed, other objects may be retained within the vase, such as oil diffuser rod, potpourri.

In addition to a vase accessory illustrated in FIGS. 1-3, other accessories can be provided operable to extend from an upper surface of the lid. Other accessories include, but are not limited to: picture frame, decorative initial (e.g., the first letter of the user's name), a battery operated night light, a pot for a plant, a cell phone holder, etc.

The accessories may have different configurations. For example, the accessories may be decorative. In addition or alternatively thereto, the accessories may be utilitarian. The accessories can also be mixed and matched regardless of the shape of the base unit and lid. For example, a round base unit and vase could be matched with a triangular vase. The use of the same male-female connection facilitates mixing and matching accessories.

Additionally, it will be appreciated that the base, lid and accessories can have a metallic finish or a colored finish. The surface can also allow for a custom adhesive wrap if desired. The custom wrap could have flowers, jewels, animals, celebrities, nature scenes, etc.

Figure 4:
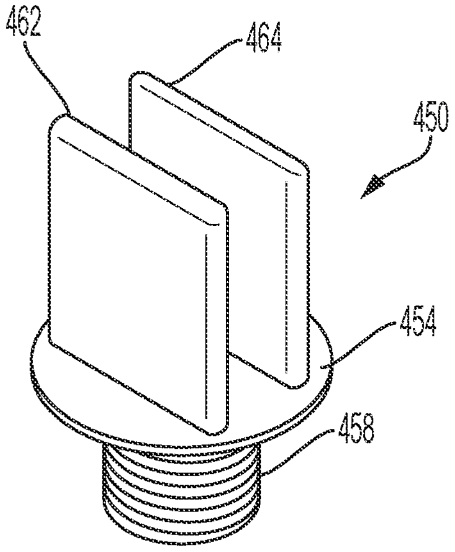
FIGS. 4-6 illustrate exemplary component parts of the lid portion of a container system.

FIG. 4 illustrates a holder retainer accessory 450. The holder accessory 450 has a lower accessory surface 454 and a threaded extension 458. Two parallel panels 462, 464 extend vertically from the lower accessory surface 454. The space between the two parallel panels 462, 464, is operable as a magazine holder, newspaper holder, napkin holder, or towel holder.

Figure 5:
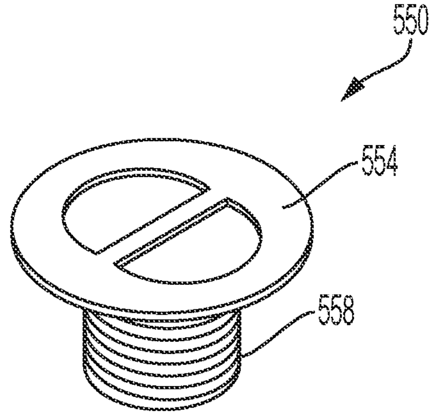

FIG. 5 illustrates a plug accessory 550. The plug accessory 550 has a lid interface accessory surface 554 and a threaded extension 558. The surface of the lid interface is configured to allow the plug accessory 550 to be installed or removed by turning the plug accessory 550. The installation feature 560 can be, for example, two recesses that allow finger access for twisting, or a slot suitable to receive the head of a screwdriver (with a flat head (straight head), a Phillips head (cross head), or an Allen key (hex key)).

Figure 6:
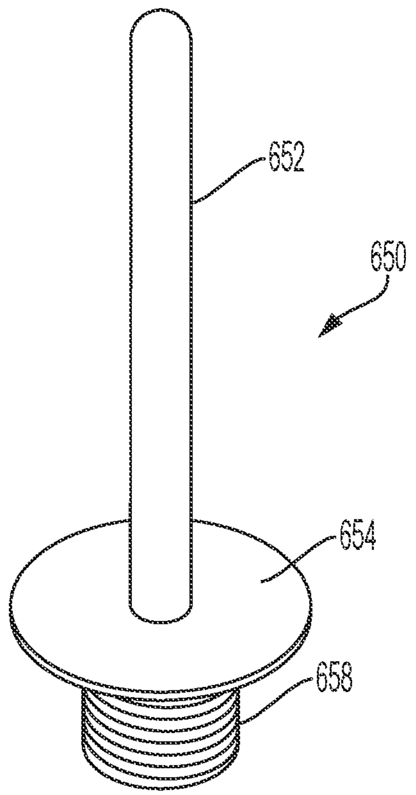

A utilitarian accessory may include a toilet paper accessory 650 that includes a vertical post or vertical rod 652, such has illustrated in FIG. 6, and a lid interface accessory surface 654. The toilet paper accessory 650 is operable to hold a roll of toilet paper or a roll of paper towels. The vertical rod 652 may have an outside diameter that is less than an interior diameter of an opening in a toilet paper roll. The vertical rod 652 may have a length that permits one, two, three, or more toilet paper rolls to be retained thereon. Where the toilet paper accessory 650 is removable from a lid (such as the lids shown in FIGS. 1-3), a threaded extension 658 can be provided to facilitate engaging the lid.

The disclosed multifunction receptacle, lid and accessories can be part of a system that is provided together or in separate component parts. The system facilitates modularity, and/or interchangeability of components to achieve different objectives.

The mating interface between the lid and the accessory may be, for example, through screw-type threads, friction fit, intend/detent to make a snap fit, etc. Different accessories and/or lids may have the same indentation and/or projection such that different accessories may be interchangeable on the same lid and/or with different lids.

As will be appreciated by those skilled in the art, the devices can be provided as part of a kit. The kit can include a multifunction container as disclosed herein, and one or more accessories selected from a group comprising a vase, a toilet paper holder, a towel holder, and an accessory, such as a blank, wherein the accessory is operable to be removably secured to the accessory interface on the upper surface of the lid. A starter kit can be, for example, a multifunction container, a lid, and a blank or a multifunction container, a lid, a blank and an additional accessory.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that any claims presented define the scope of the invention and that methods and structures within the scope of these claims and their equivalents be covered thereby.

What is claimed:

1. A multifunction container comprising:

an article receptacle comprising a horizontal base and at least one vertical side wall with an upper opening wherein the horizontal base and at least one vertical side wall define a three-dimensional interior cavity;

a lid having an upper surface operable to engage the upper opening of the article receptacle comprising a recess in the planar upper surface surrounding a threaded female accessory interface; and an accessory having a flange with an upper surface sized to fit within the recess on the upper surface of the lid operable to be removably secured via a threaded male securement member to the threaded female accessory interface on the upper surface of the lid wherein the upper surface of the flange is flush with the upper surface of the lid when the accessory is secured to the lid.

2. The multifunction container of claim 1 further comprising a side opening operable to provide access to the three-dimensional interior cavity.

3. The multifunction container of claim 1 wherein the at least one vertical side wall is a continuous side wall.

4. The multifunction container of claim 3 wherein the article receptacle has a planar cross-sectional shape selected from round, oval and ovoid.

5. The multifunction container of claim 3 wherein the at least one vertical side wall has a plurality of vertical bends.

6. The multifunction container of claim 5 wherein the article receptacle has a planar cross-sectional shape selected from triangular, square, rectangular, pentagonal, hexagonal, heptagonal, and octagonal.

7. The multifunction container of claim 1 wherein the article receptacle has a continuous cross-section along the at least one vertical side wall.

8. The multifunction container of claim 1 wherein the article receptacle has a variable cross-section along the at least one vertical side wall.

9. The multifunction container of claim 1 further comprising one or more of a liner, an interior container, and a bag retainer.

10. The multifunction container of claim 1 wherein the accessory is selected from a group comprising a vase, a toilet paper holder, a towel holder, and a blank.

11. The multifunction container of claim 10 wherein the vase has at least one vertical vase side wall with an upper vase opening wherein the at least one vertical side vase wall define a three-dimensional interior vase cavity.

12. The multifunction container of claim 11 wherein the vase has a planar cross-sectional vase shape selected from round, oval, ovoid, triangular, square, rectangular, pentagonal, hexagonal, heptagonal, and octagonal.

13. The multifunction container of claim 11 wherein the vase has a continuous cross-section along the at least one vertical vase side wall.

14. The multifunction container of claim 11 wherein the vase has a variable cross-section along the at least one vertical vase side wall.

15. The multifunction container of claim 10 wherein the toilet paper holder has a vertical post.

16. The multifunction container of claim 10 wherein the towel holder has a pair of vertical panels.

17. A kit comprising:

a multifunction container comprising an article receptacle comprising a horizontal base and at least one vertical side wall with an upper opening wherein the horizontal base and at least one vertical side wall define a three-dimensional interior cavity, and a lid with an upper surface and a recess operable to engage the upper opening of the article receptacle comprising an accessory interface on an upper surface of the lid positioned within the recess; and one or more accessories selected from a group comprising a vase, a toilet paper holder, a towel holder, and a blank, wherein each of the one or more accessories has a flange with an upper surface sized to fit within the recess on the upper surface of the lid and operable to be removably secured to the accessory interface on the upper surface of the lid.

* * * * *